United States Patent
Helble

Patent Number: 6,021,247
Date of Patent: Feb. 1, 2000

[54] ADJUSTABLE TAP FOR LIGHT-PIPE

[76] Inventor: Robert Helble, 1105 Englewood Rd., Yardley, Pa. 19067

[21] Appl. No.: 09/033,993

[22] Filed: Mar. 3, 1998

Related U.S. Application Data

[60] Provisional application No. 60/046,144, May 9, 1997.
[51] Int. Cl.[7] ..................................................... G02B 6/26
[52] U.S. Cl. ........................... 385/147; 385/901; 385/48; 81/488
[58] Field of Search ............................... 385/48, 133, 147, 385/901; 81/6, 9.22, 488

[56] References Cited

U.S. PATENT DOCUMENTS

| | | | |
|---|---|---|---|
| 4,422,719 | 12/1983 | Orcutt | 350/96.3 |
| 4,656,724 | 4/1987 | Furman | 29/566 |
| 5,432,876 | 7/1995 | Appeldorn et al. | 385/31 |
| 5,617,497 | 4/1997 | Kingstone | 385/100 |
| 5,718,666 | 2/1998 | Alarcon | 600/249 |
| 5,845,038 | 12/1998 | Lundin et al. | 385/901 |

Primary Examiner—John D. Lee
Assistant Examiner—Juliana K. Kang
Attorney, Agent, or Firm—Daniel Kramer

[57] ABSTRACT

A device for tapping into and removing a fraction of the light transmitted by a homogeneous sheathed light conducting and transmitting and conveying light pipe. The device is a transparent probe having a conical point for penetrating the sheath of the light pipe and embedding in the core and an external portion which resides outside the sheath for dissipating of transmitting the light abstracted from the core.

8 Claims, 1 Drawing Sheet

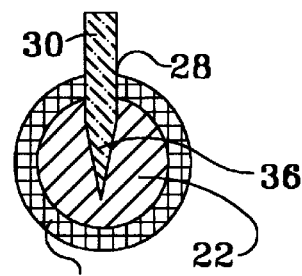
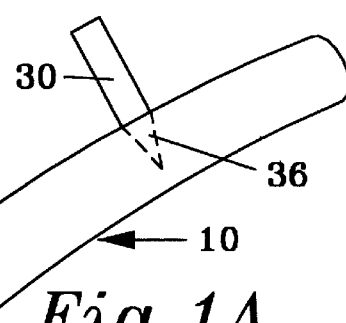
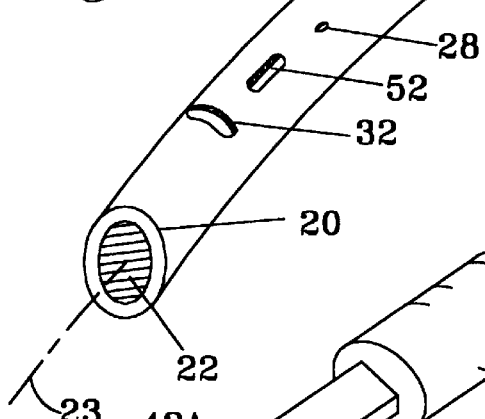
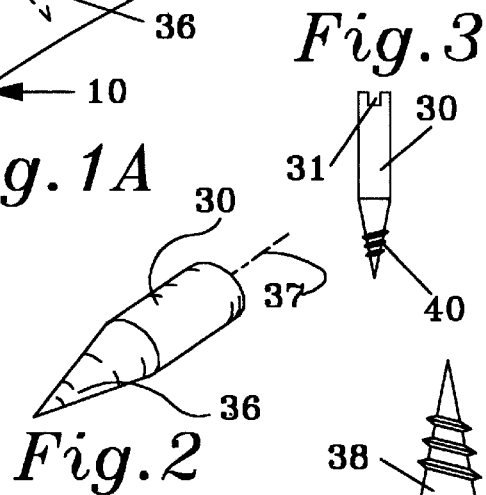
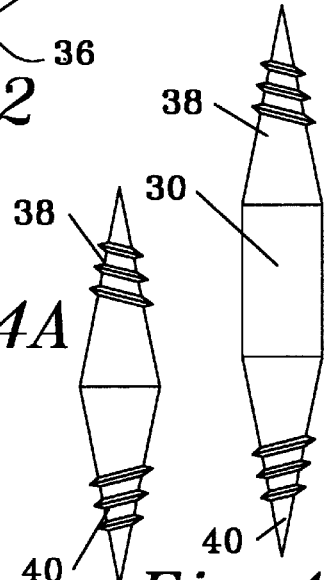
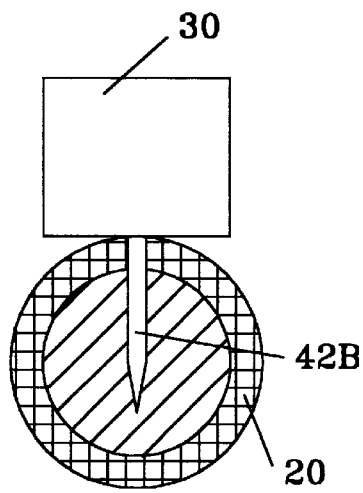
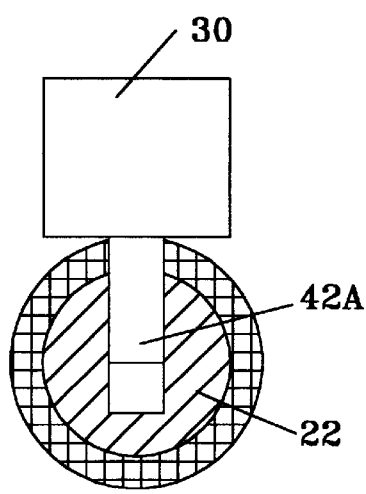
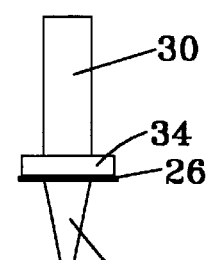

ADJUSTABLE TAP FOR LIGHT-PIPE

CROSS REFERENCE TO RELATED APPLICATIONS

Pursuant to 35 U.S.C. 119(e)(i) Applicant claims priority of Provisional Patent Application Ser. No. 60/046,144; filed May 9, 1997.

BACKGROUND

1. Field of the Invention

This invention is related to the field related to the transmission of light through fiber-optical cables.

The field of the invention is more closely related to the field related to such cables employing a single homogeneous light conductor enclosed in a flexible sheath. Such a light conductor/sheath combination will hereafter be referred to as a "light-pipe". The conductor may periodically be referred to as the core with the understanding that the terms core and conductor are synonymous. The sheath may be opaque or translucent or transparent, depending on the intended application.

The field of the invention is closely related to the field pertaining to techniques and technologies for tapping the sheath and removing from the light conducting core a portion of the light conducted thereby.

2. Prior Art

No prior art suggesting or describing the invention is known.

OBJECTS AND ADVANTAGES

It is a primary object of my invention to provide a convenient means for breaching the opaque sheath of a homogeneous light conductor and removing from the conductor a fraction of the light conducted thereby. It is a further object to provide convenient means for tapping into a sheathed light-pipe having a homogeneous light conducting core for removing and displaying a small amount of light at convenient intervals without cutting the light-pipe.

The means for breaching the sheath may be referred to as a tap and the process of do so as tapping. The terms tap and tapping being employed in the same context as when employed in connection with the spring season process of removing syrup from the trunk of a maple tree.

It is a further object to achieve the primary object without cutting the light-pipe and without inserting a tee-type fitting.

It is a further object to provide tapping means which are self sealing to the sheath, thereby protecting the core from entry of potentially degrading contaminants or moisture.

It is a further object to provide such tapping means which include means for predetermining the relative quantity of light removed from the light conducting core.

It is a further object to provide a single light tapping means which, by its relative rotational position with respect to the longitudinal axis of the core, when inserted through the sheath and into the core, determines the relative fraction of light removed by the means.

It is a further object to provide such tapping means which include integral means for penetrating the sheath.

It is further object to provide such tapping means which include means for connecting the tapping means to a branch light pipe and for transmitting the removed light thereto.

It is a further object to provide such tapping means which include integral means for securing the tapping means to the core.

It is a further object to provide such tapping means which include integral means for securing the tapping means to a branch light pipe.

DISADVANTAGES OF PRIOR TAPPING MEANS

Traditional means of installing a tap in a light pipe requires the light pipe to be cut and a special tee to be installed. This requires substantial time of a skilled person plus the cost for the fitting.

Since the traditional means of installing a tap in a light pipe requires cutting the pipe, there arises substantial opportunity for contaminants to enter the sheath through the connections required to be made to the tee. A tee fitting requires three connections. Each connection typically is in the form of a threaded compression fitting, each connection requiring a gasket, a male threaded portion and a corresponding compression nut having female threads. Aside from the cost of the fitting and the time required to make the connection, there is the accompanying leakage risk generated by three connections which could allow water or other contaminants to eater the sheath. These contaminants are likely to degrade the cut faces of the core, thereby seriously affecting the light transmitting ability of the core across the cuts.

Traditional means of installing a tap into a light pipe limits the number of taps that can be installed in a length of light pipe thereby limiting the usefulness of the old system for transmitting light to a number of branch locations.

Further, the installation of a tee degrades the flexibility of the light pipe and its ability to be drawn through a conduit.

Still further, once a light pipe has been cut, it is impossible to efficiently repair it.

Further, cutting the core generates a termination loss. That is, the cut portions do not transmit light as efficiently as a continuous, uncut, core.

ADVANTAGES

The recitation of certain advantages here for the invention should not be construed as a recitation of all the advantages, since other unrecited advantages may arise in use.

The light tapping means disclosed by the present invention provides light tapping capabilities which do not require the primary light pipe to be cut and a tee fitting installed.

The sharply reduced cost and ease of installation and repairability allows many such taps to be positioned along the length of a primary light pipe correspondingly increasing the usefulness of the light pipe for transmitting light to a multiplicity of branch locations.

The light tap of the invention does not require the light pipe to be cut, thereby eliminating the need for a threaded tee fitting. By eliminating the need for a tee, three potentially leaky connections are avoided.

Penetrating the sheath at a point generates only one point where sealing is required.

Allowing core continuity at the tap eliminates the termination losses inherent in a cut. The installation of the tap of the invention does not degrade the flexibility of the primary light pipe in which is installed.

The tap of the invention can be removed, the hole in the sheath repaired with a drop of sealant, and the mechanical integrity of the light pipe restored, thereby allowing the repaired light pipe to be freely drawn through a conduit, if necessary.

SUMMARY OF THE INVENTION

For a light pipe having a substantially homogeneous light conducting core and a sheath enclosing the core, the patent application for the invention describes and discloses tap means for intercepting and removing from the core a portion of the light transmitted thereby, said means comprising unitary light conducting means including a first part for piercing the sheath, penetrating the core and receiving light therefrom and a second part integral with said first part for imposing piercing and penetrating force on said first part and for receiving and dissipating light received therefrom, said second part having an end opposite the first part.

BRIEF DESCRIPTION OF THE DRAWINGS

FIG. 1A show a flexible light pipe with an exposed end and with a light tap of the invention installed and, at 1B, a crossection of that installed tap.

FIG. 2 shows the simplest manifestation of a light tap of the invention.

FIG. 3 illustrates a modification of a basic light tap further including both threads on the tapered portion and a screwdriver slot at the opposite end.

FIGS. 4A and 4B illustrate a modification of the tap of FIG. 3 wherein two threaded portions are joined back to back with opposite handed thread forms. FIG. 4B provides a light dissipation portion between the two oppositely threaded upping portions.

FIGS. 5A, B, and C show isometric and installed views of a modified form of the light tap of the invention having a tapping portion with a rectangular crossection.

FIG. 6 illustrates a modified form of the light-pipe tap which includes both a flange stop and a sealing gasket.

DETAILED DESCRIPTION OF THE INVENTION

While in the past it has been necessary to cut the light-pipe and install a fitting connecting the two cut pieces to remove and display a portion of the light transmitted by the pipe, with my invention, disclosed herein, it is possible to remove a small or a large portion of the light transmitted by the pipe by puncturing the sheath 20 with a pointed tool or, alternately, puncturing the sheath with the point of my tap as described below. The tap abstracts a small amount of light from that carried by the pipe without cutting the pipe. The economy of such an arrangement both in material and in time is obvious.

One use for my "tap" is to provide periodic spots of light along a walkway or a driveway to guide passersby. In this mode of use the light-pipe would be installed along the walkway and positioned just below the surface of the adjacent ground. When the length of the light pipe is in a desired position, the installer would take a series of my "taps" 30, 36 and drive the point of the tapered part 36 into the sheath 20 of the light pipe 10 so that the point and the tapered part penetrated the sheath and resided within the light conducting core 22.

My tap is made of a strong, hard light conducting plastic such as methyl methacrylate, or, alternately from glass or quartz. Though not shown, there may be light conducting fibers embedded in the tap material. The fibers are oriented to discharge light at the shaft position in a desired direction.

In FIG. 1A there is disclosed a flexible light pipe 10 having a substantially homogeneous light conducting core 22 and an opaque sheath 20. While the usual construction of the light pipe includes an opaque sheath, my invention will work equally well with a light pipe whose sheath 20 is translucent or even transparent.

An intense light source, not shown, is positioned at one or at both ends of the light-pipe 10. Lenses and or reflectors may be positioned in a way to concentrate the light emitted from the light source and direct it more efficiently into the light conducting core 22.

There is shown in FIG. 1A installed through the sheath 20 of the light pipe 10, a light tap of my invention (FIG. 2), where the conical tapered portion 36 is shown in dotted lines with the light emitting shaft 30 projecting from the sheath 20 of light pipe 10. At FIG. 1B, there is shown a crossection through the tap and light pipe 10 showing the positioning of the tapered point 36 traversing the sheath 20 of the light pipe and residing within the light transmitting light pipe core 22. In FIG. 1A the light emitting shaft 30 is positioned external of the light pipe sheath 20 whereby light abstracted from the core 22 of the light pipe 10 is transmitted to the light emitting shaft 30.

In FIG. 1A slots 52 and 32 are formed by insertion and removal of the tap illustrated in FIGS. 5B and 5C. Hole 28 is formed by insertion and removal of the tap of FIGS. 2, 3, 4, 4B or 6. The small holes in the sheath left by the removal of the taps are shown for the purpose of illustrating the ease with which the holes can be repaired by the application of an appropriate glue or mastic.

FIG. 2 is a side elevation of a simple version of the light pipe tap showing the light emitting shaft 30 and the tapered inserting/light gathering point 36. A centerline 37 is displayed. The tap 30/36 is formed of a hard transparent or translucent material capable of retaining its form during the insertion process. To achieve insertion, the tap of FIG. 2 is positioned with the point of the tapered part 36 positioned on the sheath 20 of the light pipe and the centerline 37 of the tap positioned substantially perpendicular to the centerline or axis 23 of the light pipe. Then force is applied to the end of light emitting shaft 30 along its centerline 37 until the point of tapered part 36 has penetrated sheath 20 and a portion of light transmitting core 22.

The tapered part 36 of the tap exerts a penetrating and expanding force on the sheath 20 of the light pipe 10, thereby providing a sealing effect whereby moisture and other contaminants, possibly harmful to the core, are prevented from entering the core at the point of penetration.

The tapered light-abstracting point 36 receives light from that conveyed by the light conducting core 22 and conveys that light along the body of the tap away from the tapered part and into the driver/display part 30.

There is shown in FIG. 3 a modification of the basic tap in which screw threads 40 are provided on tapered portion 36 of the tap. Employing this modification of the tap, there is provided a positive locking effect whereby the tap resists accidentally imposed stresses or strains which might tend to cause it to be removed from its position embedded within the light pipe. Screwdriver slot 31 is provided for driving the threaded tap into the light pipe or for removing it.

FIGS. 4A and 4B illustrate modifications of the basic tap for the purpose of allowing a tab to be simultaneously installed in two light pipes or in a light pipe and an article or fixture or appliance which utilizes or reacts to the light removed from the light pipe. Though not illustrated, one such modification contemplates a light meter or light sensing relay installed to receive the light tapped from the light pipe. Another application of the double ended tap is to transmit light from the source light pipe to a "slave" light pipe. In FIGS. 4A and 4B the threads 38 and 40 are both right-handed threads. With this construction, the light transmitting and the light receiving elements can be "tapped" by the single tap of FIG. 4 simply by turning the tap, since the same direction of tap rotation will cause both threaded points to drive into their respective emitting and receiving elements. The same result would be achieved if both threads 38 and 40 were left-handed threads. In another embodiment of the invention threads 38 and 40 have different directions.

In FIG. 4B there is shown a light emitting shaft 30 joining the two tapered, thread bearing portions 38, 40 whereby visual monitoring of the lighted condition of the source light pipe is made possible.

FIGS. 5A, 5B and 5C illustrate a modified tap where the penetrating and light receiving portion has an elongated rectangular rather than a conical shape. FIG. 5A shows an isometric view of this construction where light emitting shaft or probe 30 is contiguous with an elongated rectangular shape having narrow side 42B and wide side 42A with a chisel shaped end 43 adapted to cut through and penetrate the sheath 20 of the light pipe 10.

In FIG. 5B the tap is shown installed with its narrow side 42B collinear with the light pipe axis 23 (FIG. 1A), whereby a minimum amount of light transmitted by the light pipe core 22 is intercepted and removed by the tap. In this position a slot 52 as shown in FIG. 1A is formed.

By contrast, in FIG. 5B, the narrow side 42B is positioned transverse or perpendicular to the light pipe axis 23, thereby exposing the broad side 42A of the light interceptor, whereby a relatively large fraction of the light transmitted by the light pipe core 22 is intercepted and removed by the tap. In this position a slot 32 as shown in FIG. 1A is formed. The amount of light removed by the tap can be adjusted to a value intermediate to that removed by positions shown in FIGS. 5B and 5C, simply by installing the tap in a position where the plane of the broad side 42A is at an angle to light pipe axis 23 whose value is between zero and ninety degrees, or, expressed differently, between the positions shown in 5B and 5C.

In FIG. 6 a tap similar to that of FIG. 2 is shown, except an integral shoulder 34 is provided to positively control the depth of penetration of the tap into the light pipe. A gasket 26 is provided for applications where an unusually adverse or contaminating environment is contemplated or encountered.

From the foregoing description, it can be seen that the present invention comprises an advanced means for tapping a light pipe and for removing therefrom a portion of the light it carries. It will be appreciated by those skilled in the art that changes could be made to the embodiments described in the foregoing description without departing from the broad inventive concept thereof. It is understood, therefore, that this invention is not limited to the particular embodiment or embodiments disclosed, but is intended to cover all modifications which are within the scope and spirit of the invention as defined by the appended claims and equivalents thereof.

I claim:

1. Unitary light conducting tap means for piercing the sheath and intercepting and removing a portion of the light transmitted by the substantially homogeneous light conducting core of a light pipe while residing therein, said light conducting tap means comprising a first light conducting part for piercing the sheath, penetrating the core and receiving light therefrom and a second light conducting part integral with said first part for receiving and dissipating outside the sheath the light received from the first part.

2. Tap means for removing light from a light pipe as described in claim 1, further providing a conically shaped first part having threads positioned thereon to engage said light conducting core, said threads having a direction.

3. Tap means for removing light from a light pipe as described in claim 2, further providing a third light conducting part, said third part comprising a second conical piercing and penetrating means positioned at the end of the second part opposite the first part and coaxial with it.

4. Tap means for removing light from a light pipe as described in claim 3, further providing that the third part includes threads having the same direction as the threads on the first part.

5. Tap means for removing light from a light pipe as described in claim 3, further providing that the third part includes threads having an opposite direction from the thread direction on the first part.

6. Tap means for removing light from a light pipe as described in claim 1, further providing a flange coaxial with the first part and positioned at the intersection between the first and the second parts.

7. Tap means for removing light from a light pipe as recited in claim 1 further providing that the first part has a substantially rectangular cross-section having a broad side and a narrow side.

8. For a light pipe having a substantially homogeneous light conducting core and a sheath enclosing the core, means for piercing, intercepting and removing from the core a portion of the light transmitted thereby, said means comprising a unitary light conducting tool including a first light conducting part for piercing the sheath, penetrating the core and receiving light therefrom while residing therein and a second light conducting part contiguous with said first part for receiving and dissipating light received from the first part, said piercing and penetrating first part comprising a probe having a substantially rectangular cross-section having a broad side and a narrow side.

* * * * *